May 3, 1938.  F. M. ASHLEY  2,115,696
PIPE PROP
Filed April 24, 1936
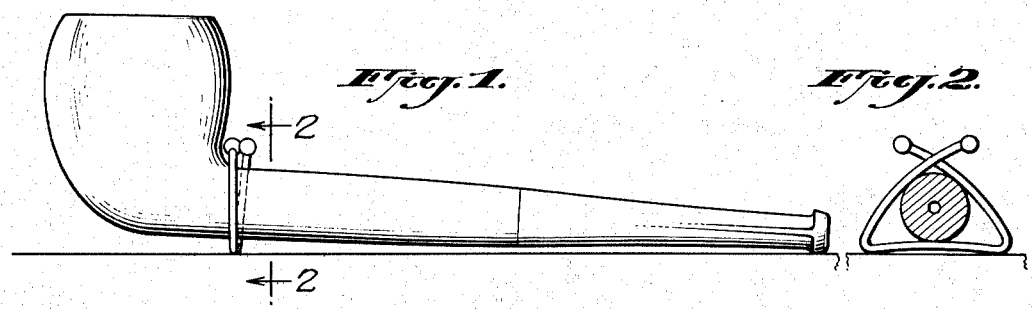
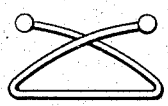 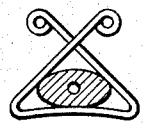 
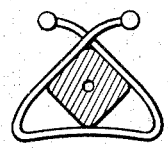 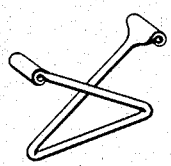 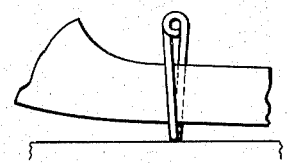
 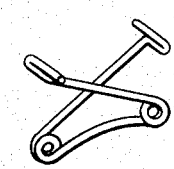 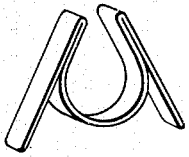
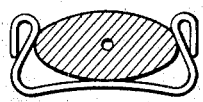
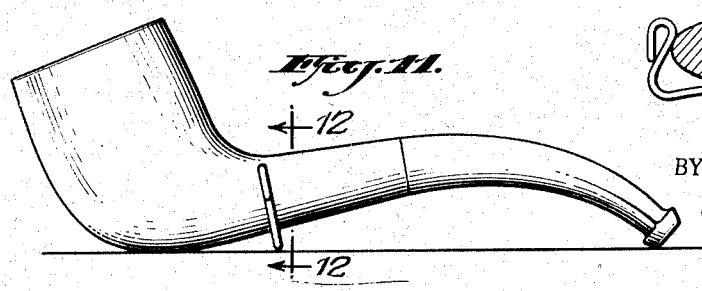
INVENTOR.
FRANK M. ASHLEY.
BY Ashley & Ashley
ATTORNEYS Patented May 3, 1938

2,115,696

UNITED STATES PATENT OFFICE 2,115,696

PIPE PROP

Frank M. Ashley, Great Kills, Staten Island, N. Y., assignor to Lewis Gompers, as trustee Application April 24, 1936, Serial No. 76,148

5 Claims. (Cl. 131—12)

My invention relates to pipes for smoking tobacco.

The object of my invention is to provide a support or prop to be attached to the stem of a pipe to prevent the bowl from tipping over and spilling ashes therefrom.

A further object is to provide a pipe prop that is very cheap to make, weighs very little, is ornamental, and that may be attached to pipes having various shapes of stems, such as round, oval, triangular, etc., in cross section, and which may be attached or detached without danger of injury to the surface of the pipe stem on which it is mounted.

My attachment may be made in various forms, a number of which I have illustrated, but I have found from experience in making them that the triangular shape or form is best for the purpose.

Referring to the drawing which forms a part of this specification:

Fig. 1 is a longitudinal side view of a pipe having a round bottom bowl, supported by a pipe prop embodying my invention.

Fig. 2 is a view taken on line 2—2 of Figure 1, showing a prop mounted on a stem, the stem being shown in cross section.

Fig. 3 is a view of a prop as it appears prior to being mounted on the stem of a pipe.

Fig. 4 shows a prop mounted on a stem having greater width than thickness, and showing the ends shaped to prevent the free ends from contacting the finger, etc.

Fig. 5 is a view showing the ends of a prop extending at an angle to the plane of the inclined side portions.

Fig. 6 is a side view of the construction in which the free ends of the wire prop are bent into circular form to provide handles that may be easily pressed toward each other without discomfort, in the act of placing the prop on the pipe-stem.

Fig. 7 is a view showing a prop mounted on a stem that is square in cross section and positioned relative to the bowl of a pipe as indicated.

Fig. 8 shows a prop formed with its ends flattened and bent to provide smooth cylindrical ends.

Fig. 9 illustrates another form of prop, the free ends of which are bent upwardly and bent over into the form shown in Figure 4.

Fig. 10 illustrates another form in which the wire is twisted to form springs at each lower end, and the upper ends are bent to provide laterally extending handles.

Fig. 11 is a side view of a pipe having a curved stem, and showing a side view of the construction or form of the prop illustrated in Fig. 12 taken on line 12—12 of Fig. 11, in which is shown a pipe stem of unusual width, and a prop in which the sides do not extend across each other.

Fig. 13 shows another form of prop, made of a flat strip of metal, or other suitable resilient spring material and bent to the form shown wherein the free ends rest on the supporting surface in the act of holding a pipe.

The wire, which I prefer to use, may be of any resilient material and of any desired cross section or form, so long as it is resilient and its limbs will bend in the act of placing it on the stem of a pipe.

I have found that piano wire three-sixty-fourths of an inch in diameter, serves the functions very well.

The props may be made in several sizes if desired, but I have found one made the size and dimensions shown in Figure 3, serves very well for the average sizes of pipe-stems on the market.

In placing the prop on a pipe, the constructions shown in Figures 1 to 10, inclusive are applied by pressing the upper ends of the prop toward each other which causes the side portions and bottom side to bend, thereby increasing the opening of the triangle to permit the prop to slip over the stem without scraping its surface, and when the pressure on the end is released, the spring action of the metal instantly clamps the prop to the stem with sufficient pressure to hold it in position on the stem and to prevent the pipe from tilting.

The constructions illustrated in Figures 11, 12, and 13, also show a three point contact with the stem of a pipe when mounted thereon.

When the prop is mounted on a stem, its form changes from a straight line as shown in Figure 3, to a curve, as illustrated in Figures 2, 4, and 5, which prevents the prop from rocking.

In applying the constructions shown in Figures 11, 12, and 13, the free ends of the prop are separated until the prop is in position on the stem, after which the ends are released and the sides of the prop will embrace the stem, as will be readily understood.

It is believed that the foregoing description and the drawing illustrating the forms of construction, are such that any person interested will fully understand the invention disclosed herein, and that further description is therefore not necessary.

Having thus described my invention I claim as new:

1. A pipe prop made in a single piece of resilient material shaped to embrace the stem of a pipe on three sides thereof, the free ends of which extend laterally above the stem a distance beyond the width of the stem on opposite sides thereof whereby the extreme portions of said free ends can be moved relative to each other.

2. A pipe prop made from a single piece of resilient material shaped to provide a triangular form, the upper end portions of which extend across each other a predetermined distance and rest in contact, and the base of which extends laterally beyond the upper portions.

3. A pipe prop made of a single piece of resilient material shaped to embrace the stem of a pipe on three sides thereof, the ends of said piece being formed to provide handles, and the side portions thereof each extending beyond the adjacent wall surface of the stem to support the pipe on which it is mounted.

4. A pipe prop made of resilient material shaped to contact the stem of a pipe and formed with a longitudinally extending lower portion and two portions extending upwardly therefrom and inwardly toward each other; the construction being such that the three side portions will contact with the stem of a pipe at three points separated at selected distances apart when mounted thereon.

5. A pipe prop made of resilient material and formed to provide a triangle the lower side of which extends longitudinally a predetermined distance beyond each side of the stem on which it is to be mounted and the other sides extend upwardly and inwardly toward each other; the prop being adapted to contact the pipe stem at three separated points and held on the stem by the clasping action only, and to have point or line contact with the sides of said pipe stem.

FRANK M. ASHLEY.